(12) United States Patent
Sankararaman et al.

(10) Patent No.: US 11,205,313 B2
(45) Date of Patent: Dec. 21, 2021

(54) PHYSICAL LOCK ELECTRONIC INTERFACE TOOL

(71) Applicant: Tekion Corp, San Ramon, CA (US)

(72) Inventors: Gurusankar Sankararaman, Dublin, CA (US); Justin Alexander Chi-Young Hou, Pleasanton, CA (US); Keshav Athreya, Chennai (IN); Sanyam Agrawal, Bengaluru (IN)

(73) Assignee: Tekion Corp, Pleasanton, CA (US)

( * ) Notice: Subject to any disclaimer, the term of this patent is extended or adjusted under 35 U.S.C. 154(b) by 0 days.

(21) Appl. No.: 17/233,212

(22) Filed: Apr. 16, 2021

(65) Prior Publication Data

US 2021/0327182 A1 Oct. 21, 2021

Related U.S. Application Data

(63) Continuation of application No. 17/229,581, filed on Apr. 13, 2021.

(60) Provisional application No. 63/010,657, filed on Apr. 15, 2020.

(51) Int. Cl.
*G07C 9/00* (2020.01)
*B60R 25/24* (2013.01)
*B60R 25/102* (2013.01)
*B60R 25/30* (2013.01)

(52) U.S. Cl.
CPC ........ *G07C 9/00571* (2013.01); *B60R 25/102* (2013.01); *B60R 25/24* (2013.01); *B60R 25/305* (2013.01); *G07C 9/00309* (2013.01); *G07C 2209/08* (2013.01); *G07C 2209/63* (2013.01)

(58) Field of Classification Search
CPC ... G07C 9/00; G07C 2209/63; G07C 2209/08
See application file for complete search history.

(56) References Cited

U.S. PATENT DOCUMENTS

| 9,554,277 | B2* | 1/2017 | G | G07C 9/00571 |
| 9,741,186 | B1* | 8/2017 | Lemke | H04L 63/0492 |
| 10,223,596 | B1* | 3/2019 | Edwards | G06K 9/4604 |

(Continued)

OTHER PUBLICATIONS

United States Office Action, U.S. Appl. No. 17/229,581, dated Sep. 24, 2021, 8 pages.

(Continued)

*Primary Examiner* — Daniell L Negron
(74) *Attorney, Agent, or Firm* — Fenwick & West LLP

(57) ABSTRACT

A physical lock interface system facilitates secure and remote control of assignment and enablement of physical lock systems. The system receives a request to enable a user to disable a physical lock during a particular range of time. The lock is associated with a geofence boundary defined by a geofence. During the range of time, the system monitors for a presence of the user within the geofence. In response to determining that the user is within the geofence during the range of time, the system transmits a communication to an application of a client device of the user. The application is configured to interact electronically with the physical lock and to cause the client device to display information identifying the physical lock based on the communication. The system detects an electronic signal initiated by the application while the user is within the geofence and disables the physical lock.

17 Claims, 5 Drawing Sheets

(56) References Cited

U.S. PATENT DOCUMENTS

| | | |
|---|---|---|
| 2002/0142831 A1 | 10/2002 | Mattice et al. |
| 2016/0335438 A1 | 11/2016 | Dadu et al. |
| 2017/0033944 A1 | 2/2017 | Nadathur et al. |
| 2017/0243410 A1 | 8/2017 | Caballero |
| 2018/0114385 A1 | 4/2018 | Gullicksen |
| 2019/0159003 A1 | 5/2019 | Padgett et al. |
| 2019/0286806 A1 | 9/2019 | Robinson et al. |
| 2019/0312737 A1 | 10/2019 | Mani et al. |
| 2019/0378055 A1 | 12/2019 | Whitt et al. |

OTHER PUBLICATIONS

International Search Report and Written Opinion, Patent Cooperation Treaty Application No. PCT/US2021/027549, dated Jul. 14, 2021, 16 pages.

\* cited by examiner

PHYSICAL LOCK ELECTRONIC INTERFACE TOOL

CROSS REFERENCE TO RELATED APPLICATION

This application is a continuation of U.S. patent application Ser. No. 17/229,581, filed on Apr. 13, 2021, which claims the benefit of U.S. Provisional Application No. 63/010,657, filed Apr. 15, 2020, each of which is incorporated herein by reference in its entirety.

BACKGROUND

Field of Art

This disclosure relates generally to physical lock systems and more particularly to enabling secure remote operation of a physical lock.

DESCRIPTION OF ART

Physical locking mechanisms are used to secure and store physical items. However, logistics of maintaining physical keys and ensuring that only authorized users can disable a lock can be costly and prone to errors or interference by bad actors. This can be especially true for entities that maintain and use many locks at once. It is additionally difficult to manage transfer of authorized access to locks. For physical keys, typically, one party must meet up or communicate directly with a second party to transfer a key or an entry code in order for the second party to be able to enable or disable the lock. For electronic access codes, additional security risks exist in that access codes can be intercepted and used by unauthorized parties.

SUMMARY

Systems and methods are disclosed herein for enabling secure and remote control of assignment and enablement of physical lock systems. One embodiment of a disclosed system, method, and computer readable storage medium disclosed herein includes receiving, by a physical lock interface system, a request to enable a user to disable a physical lock during a particular range of time. The lock is associated with a boundary defined by a geofence. During the range of time, the physical lock interface system monitors for a presence of the user within the geofence. In response to determining that the user is within the geofence during the range of time, the physical lock interface system transmits a communication to an application of a client device of the user, that is, an application installed on a client device of the user or an application that is otherwise accessible by the user via the client device. The application of the client device of the user is configured to interact electronically with the physical lock and is also configured to cause the client device to display information identifying the physical lock based on the communication. The disclosed system, method and computer readable storage medium further includes detecting, by the physical lock interface system that manages the physical lock, an electronic signal initiated by the application while the user is within the geofence and, responsive to detecting the electronic signal, disabling the physical lock.

In an embodiment, the physical lock, when disabled, provides access to the user to a physical key for accessing a vehicle. In this embodiment, the system, method, and computer readable medium further include, prior to detecting the electronic signal initiated by the application while the user is within the geofence, detecting a disabling of the physical lock. For example, the physical lock interface system might be in communication with sensors on the lock that provide a notification when a lock is tampered with or otherwise disabled in an unauthorized manner. Responsive to detecting the disabling of the physical lock prior to detecting the electronic signal initiated by the application while the user is within the geofence, the physical lock interface system transmits a communication to a server such as a server associated with an original equipment manufacturer of a vehicle or other administrator of a vehicle security system, to prevent access to a vehicle by way of the physical key without additional verification. For example, an onboard computer for a loaner car may receive the communication that the lock on a box storing the key to the car was disabled without the user having been present in the geofence associated with the lock, possibly indicating that the lock was tampered with and the key was stolen. The onboard computer can prevent access to the car using the potentially compromised key until additional verification is received by the contactless server system. The physical lock interface system may additionally transmit a communication to the application of the client device to cause the client device to display a request for the user to enter a verification code. The verification code is used by the physical lock interface system to verify that an authorized user is accessing the lock and that the lock was not tampered with. The physical lock interface system receives the additional verification comprising the verification code and, responsive to the receipt of the additional verification, transmits a communication to the server to prevent access to enable access to the vehicle by way of the physical key.

In an embodiment, monitoring for a presence of the user, for example within the geofence, comprises receiving a photo of an area within the boundary defined by the geofence from a camera that is positioned to capture images of vehicles entering the boundary defined by the geofence. The system, method, and computer readable medium further includes analyzing the photo to determine a unique identifier of the vehicle shown in the photo and determining that the unique identifier of the vehicle matches a unique identifier of a vehicle that is known to be associated with the user. That is, the physical lock interface system may identify the presence of the user within the geofence boundary by monitoring for and identifying a vehicle known to be associated with the user.

Prior to disabling the physical lock, the disclosed system, method, and computer readable storage medium, in one embodiment, includes determining that one or more documents of a predefined set of documents has not been completed by the user. The physical lock interface system transmits a communication to the application of the client device to cause the client device to display information identifying the one or more incomplete documents. For example, the system may require a user to fill out and execute a form such as a waiver before the lock can be disabled and the system may send an incomplete form to the user device of the user so that the form can be completed electronically. Prior to disabling the physical lock, the physical lock interface system determines that the one or more incomplete documents are subsequently completed by the user.

In one embodiment, the disclosed system, method, and computer readable medium further includes, transmitting, in response to determining that the user is within the geofence during the range of time, transmitting a communication to a system that manages the physical lock to activate a light associated with the physical lock. The light identifies the physical lock from among a plurality of physical locks. For example, a physical lock securing a mailbox may be placed among many other mailboxes with other physical locks. Activating a light on the physical lock will help the user to easily identify the physical lock on the correct mailbox.

One embodiment of a disclosed system, method and computer readable storage medium is disclosed herein for, prior to detecting the electronic signal initiated by the application while the user is within the geofence, detecting a disabling of the physical lock. Responsive to detecting the disabling of the physical lock prior to detecting the electronic signal initiated by the application while the user is within the geofence, the disclosed embodiment includes transmitting a communication to an application of a client device of an operator associated with management of the physical lock. The application is configured to cause the client device of the operator to display information identifying the physical lock based on the detection, and the communication includes instructions to display the information identifying the physical lock based on the detection. For example, if the physical lock interface system receives a notification that a lock has possibly been tampered with, a communication may be transmitted to a manager of the physical lock, alerting the manager of the possibility that the lock has been damaged or accessed in an unauthorized manner.

The features and advantages described in this summary and the following detailed description are not limiting and not all-inclusive. Many additional features and advantages will be apparent to one of ordinary skill in the art in view of the drawings, specification, and claims hereof.

Figure 1:
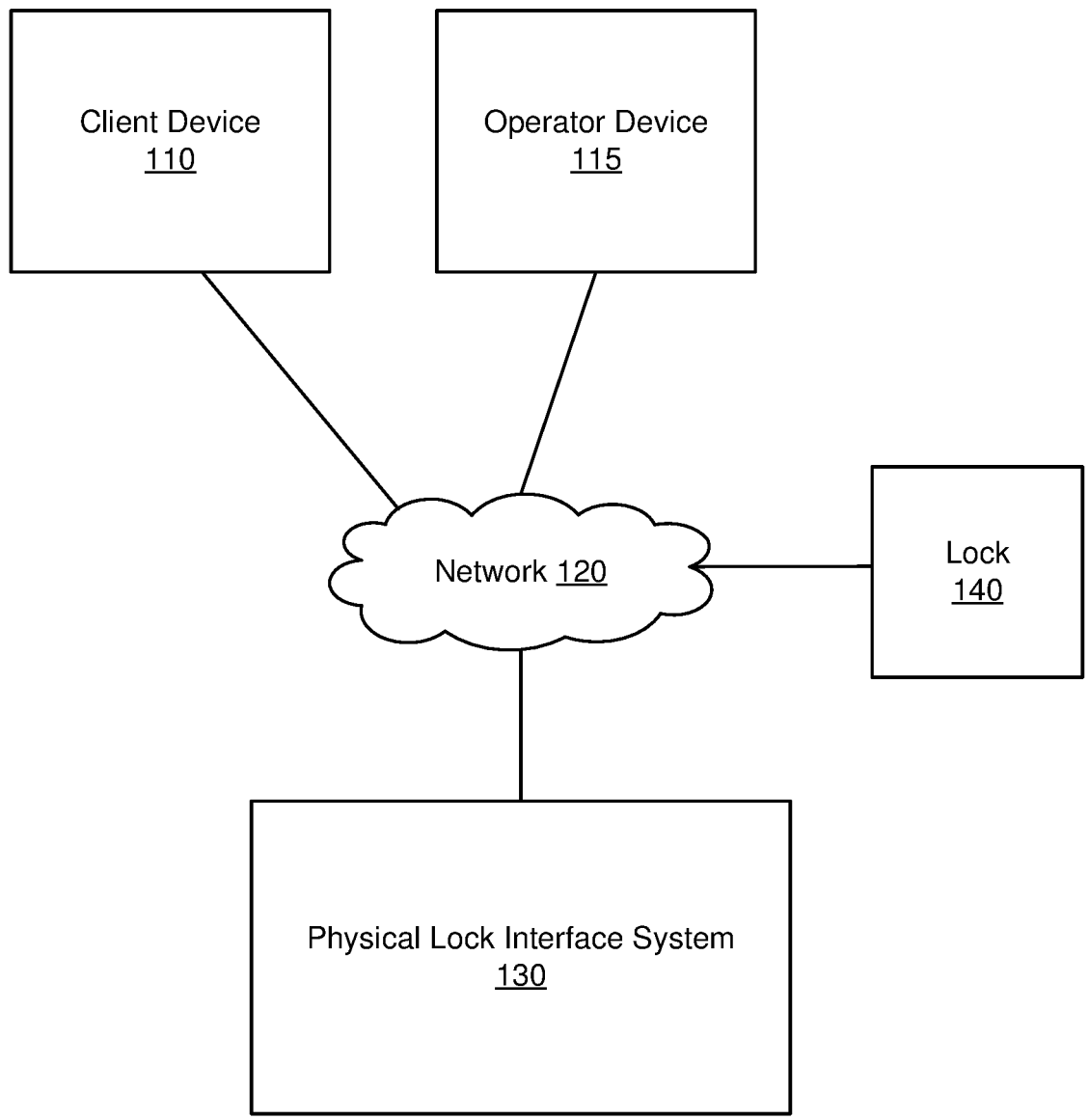
FIG. 1 is a high-level block diagram of a system environment for a physical lock interface system, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

FIG. (Figure) 1 is a high-level block diagram of a system environment for a physical lock interface system 130, in accordance with an example embodiment. The physical lock interface system 130 facilitates secure and remote control of physical locks. The physical lock interface system 130 manages assignment of physical locks to users and handles verification and authentication of users requesting to disable the physical locks. In the example of FIG. 1, the system environment of the physical lock interface system 130 includes a client device 110, an operator device 115, a network 120, a lock 140, and the physical lock interface system 130. For clarity, although only one client device 110, one operator device 115, and one lock 140 are shown in FIG. 1, embodiments of the system environment can have any number of client devices 110, operator devices 115, and locks 140. The functions performed by the various entities of FIG. 1 may vary in different embodiments.

Client devices 110 are user devices that allow client users to interact with the physical lock interface system 130. A client user interacting with a client device 110 may generally be a customer, vendor, or other outside entity interacting with the entity that operates and controls the locks 140. The client devices 110 are mobile electronic computing devices, such as smartphones, tablets, and computers that are configured to communicate with the physical lock interface system 130 via a network 120. In some embodiments, a client device 110 may be an onboard computer of a vehicle. Client devices 110 may include global positioning system (GPS) receivers or other means of location detection.

The operator devices 115 are user devices that allow operators to interact with the physical lock interface system 130. The operator devices 115 are computing devices associated with administration, operation, and management of the physical lock interface system 130 and/or associated with management of the locks 140. An operator device 115 is generally operated by an operator who may be an administrative user such as a user associated with an entity that hosts locks 140. For example, an operator device 115 may be a smartphone of a clerk who helps to manage locks 140 and administration of a physical lock interface system 130 for a company. Although both client device 110 and operator devices 115 are sometimes referred to separately herein, they can be understood to be two use cases of a user device that provides interaction by a user with the physical lock interface system 130. In various embodiments, the operator devices 115 have the same functionalities as the client devices 110 as described herein. Similarly, in various embodiments, the client devices 110 have the same functionalities as the operator devices as described herein. An operator device 115 may be a computer, a mobile computing device such as a smartphone, tablet, or laptop, a server, a client device or another computing system that can communicate with the physical lock interface system 130 either locally or over a network 120.

The network 120 may comprise any combination of local area and wide area networks employing wired or wireless communication links. In some embodiments, all or some of the communication on the network 120 may be encrypted.

The physical lock interface system 130 facilitates user and operator interactions with locks 140. A physical lock 140 may be any physical locking mechanism that can be enabled and disabled remotely, for example, in response to receipt of an electronic signal from the physical lock interface system 130. In some embodiments, a lock 140 is one of a set of multiple locks that are associated with the physical lock interface system 130. A set of locks 140 may be grouped together at one physical location or may be spread out in various situations. For example, at a dealership that provides vehicle service a row of lockboxes secured by locks 140 may be provided for customers to securely pick up and drop off keys to their vehicles for servicing. As another example, each mailbox in a mailroom may be secured with a lock 140, forming a wall of stationary locks. As another example, a lock 140 may be attached to and used to secure one of a fleet of bicycles in a bike share program, and thus the set of locks 140 associated with the bicycles in the program may be distributed around a city as the bicycles are accessed and moved. Each lock 140 in a set of locks 140 may include an identification appliance so that the lock 140 can be identified from among the other locks 140 in the set of multiple locks. Examples of identification appliances include a light, a speaker, and an electronic display. The identification appliance may be coupled to the mechanism of the lock 140 or may be nearby the lock 140, for example, on a door of a mailbox that is secured with a lock 140.

The physical lock interface system 130 manages access to a set of locks 140. The physical lock interface system 130 is a computing system that is configured to communicate with client devices 110, operator devices 115, and locks 140 over a network 120. The physical lock interface system 130 may be associated with an entity or organization that manages the set of locks 140. When a client device 110 or an operator device 115 requests a lock assignment for a user, the physical lock interface system 130 prepares and allocates a lock 140 to the user. The physical lock interface system 130 also stores information about geofence boundaries associated with the lock 140, and stores information about conditions that need to be met for the lock to be disabled. For example, a user may be required to complete and submit a form and be within a geofence boundary associated with the lock 140 before the physical lock interface system 130 will disable the lock 140 assigned to the user.

Figure 2:
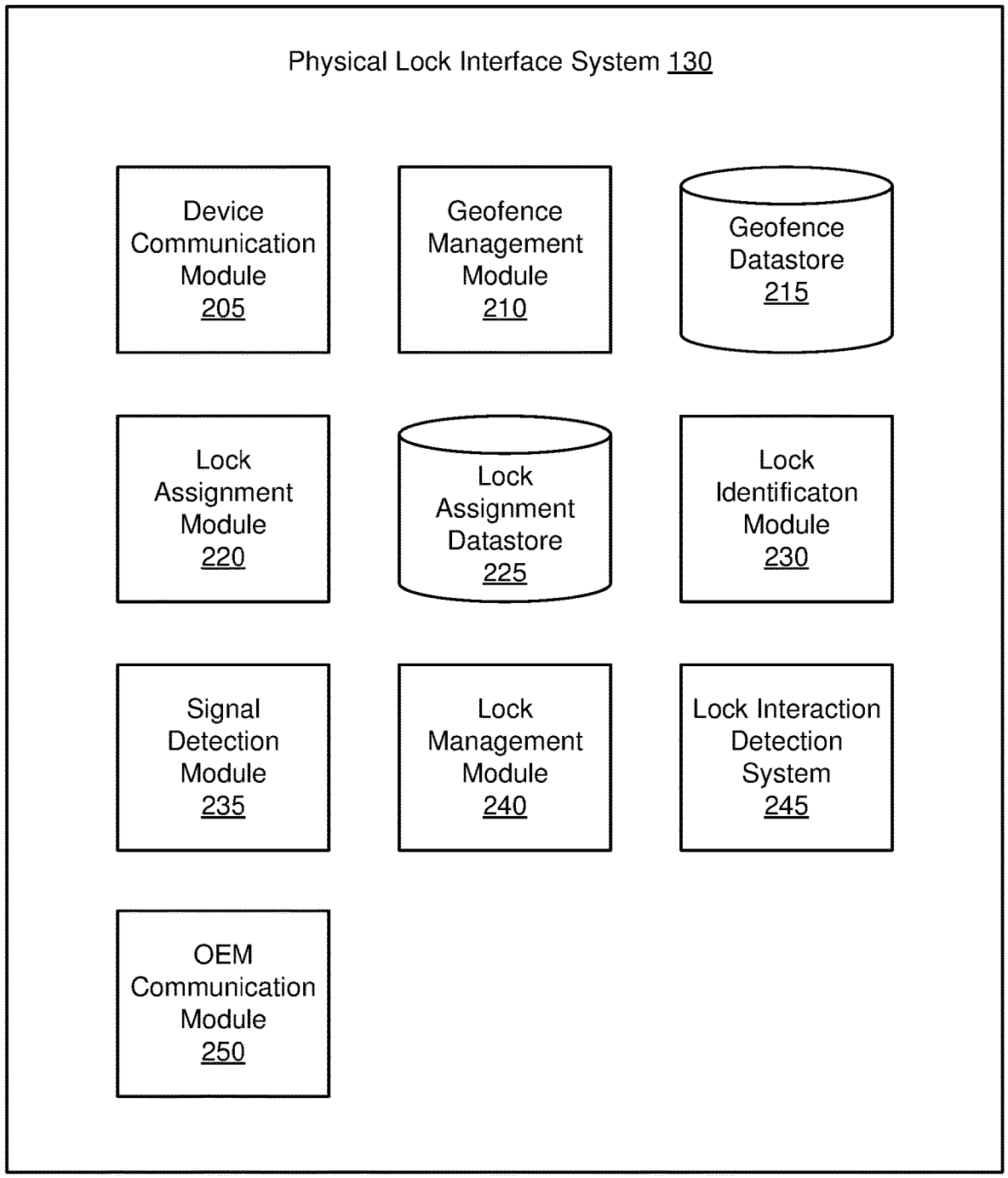
FIG. 2 is a high-level block diagram of a system architecture for the physical lock interface system, in accordance with an example embodiment.

FIG. 2 is a high-level block diagram of a system architecture for the physical lock interface system 130, in accordance with an example embodiment. The system architecture includes various modules and data stores to manage user interactions with physical locks 140. The physical lock interface system 130 includes a device communication module 205, a geofence management module 210, a geofence datastore 215, a lock assignment module 220, a lock assignment datastore 225, a lock identification module 230, a signal detection module 235, a lock management module 240, a lock interaction detection system 245, and an OEM communication module 250. Computer components such as web servers, network interfaces, security functions, load balancers, failover servers, management and network operations consoles, and the like are not shown so as to not obscure the details of the system architecture. Additionally, the physical lock interface system 130 may contain more, fewer, or different components than those shown in FIG. 2 and the functionality of the components as described herein may be distributed differently from the description herein. Furthermore, the components of FIG. 2 can be included, additionally or alternatively, in any suitable component shown in FIG. 1. Additionally, some or all functionality of the modules of FIG. 2 may be performed by an application installed on user devices such as a client device 110 and an operator device 115.

The device communication module 205 facilitates communication between the physical lock interface system 130 and the client devices 110 and operator devices 115. The client devices 110 transmit requests to the physical lock interface system 130. For example, a client device 110 may transmit a request to the device communication module 205 requesting for a physical lock 140 associated with a user of the client device 110 to be disabled. The client devices 110 and physical lock interface system 130 can also communicate via the device communication module 205 about information related to assignment of locks 140, requests and confirmation about whether required conditions have been met for a lock 140 to be disabled, and information about geofence boundaries associated with the locks 140. The device communication module 205 also transmits messages between the physical lock interface system 130 and operator devices 115. Examples of information communicated between the operator devices 115 and the device communication module 205 include notifications about locks 140 that have been enabled or disabled, administrative communications, and scheduling tasks. For example, an operator may schedule a lock 140 assignment for a user via an operator device 115 in communication with the device communication module 205. As another example, the physical lock interface system 130 may be configured to notify an operator device 115 via the device communication module 205 when a sensor at a lock 140 senses that the lock has been disabled.

The geofence management module 210 manages geofence boundaries that are associated with the locks 140. Managing the geofence boundaries includes establishing geofence boundary parameters and monitoring information that is received from client devices 110 related to the location of the client devices with respect to the geofence boundary. The geofence management module 210 generates a geofence to be stored in relation to a lock 140. A geofence comprises a geofence boundary that defines a virtual geographic perimeter. A perimeter may be defined by a radius with a lock 140 at the center, or may be defined by another shape specified around the area associated with the lock 140 or multiple locks 140. A global positioning system (GPS) transmitter on client device can provide a location of the client device and when the geofence management module 210 is notified that the client device 110 location is surrounded by the defined geofence perimeter, then the client device 110 is within the geofence. The geofence management module 210 may associate a separate geofence boundary with each lock 140, or, in alternate embodiments, one geofence boundary may be associated with multiple locks 140, such as when a group of locks 140 are all physically located near to each other and can thus be surrounded by the same boundary (e.g., a bank of post office boxes). In some cases, a new geofence boundary may be established by the geofence management module 210, for example each time a lock 140 is reassigned to a new user. In one embodiment, the geofence management module 210 may confirm whether a client device 110 is within a designated geofence boundary, given information about the current location of the client device 110.

In some embodiments, the geofence management module 210 monitors location detection of client devices 110 and/or users associated with client devices using techniques other than or in addition to GPS sensing. In one embodiment, the geofence management module 210 manages one or more beacons. The geofence management module 210 associates a signal radius of the beacon with the geofence boundary for that beacon and a location may include multiple beacons to cover a larger area. When a client device 110 connects with a beacon, the geofence management module 210 identifies the client device 110 as being within the range of the geofence boundary associated with the beacons. A client device 110 using an application associated with the physical lock interface system 130 may connect with a beacon by transmitting a query that a beacon may detect and respond to. Alternatively, beacons may continuously transmit pings and any applications on client devices 110 within range of the beacon may detect the ping when the application is active. In another embodiment, the physical lock interface system 130 may include other sensors such as cameras which can capture photos or video to determine whether a user associated with a certain lock 140, client device 110, or operator device 115 is within a designated boundary. For example, the geofence management module 210 receives images from a camera that films an entrance to a parking lot. The geofence management module 210 executes image recognition software that may be trained, for example, to detect license plate numbers and match the numbers to known user license plates to determine that a user is within the lot boundary associated with a lock 140. In still another example embodiment, the geofence management module 210 determines that a user has connected to an IP address associated with the physical lock interface system 130 to determine that the user is within a designated area for interacting with a lock 140.

The geofence management module 210 stores data about geofences in the geofence datastore 215. The geofence datastore 215 may store information including associations of geofence boundaries with specific locks 140, geofence boundary parameters, and information about whether client devices 110 are currently located within the geofence boundaries. In embodiments using GPS sensing to determine the location of client devices within geofence boundaries, the geofence datastore 215 may store geographic coordinates that define the geofence boundaries. In embodiments that employ beacons for detecting the proximity of client devices 110, the geofence datastore 215 may store information about the one or more beacons that together define the geofence boundaries.

The lock assignment module 220 allocates locks 140 to users of client devices 110 and manages lock 140 access rules associated with the assignments. Depending on the use case, the physical lock interface system 130 may reassign locks to be associated with different users at different times. When the device communication module 205 receives a request from a client device 110 or from an operator device 115 to assign a lock to a user of a client device 110, it may transmit the request to the lock assignment module 220. The lock assignment module 220 determines whether any physical locks 140 are available at the required time and selects one of the available locks 140 to assign to the user in response to the request. In performing lock 140 assignments, the lock assignment module 220 also manages scheduling of future assignments. For example, if a rental car center uses locks 140 to secure boxes holding rental car keys, the lock assignment module 220 may schedule a lock 140 to be associated with a renter within a future time window when the user is expected to pick up the rental car.

In addition to scheduling lock 140 assignments, the lock assignment module 220 establishes conditions associated with disabling each lock 140. The conditions for disabling a lock 140 may be generated at the time that the lock 140 is scheduled for assignment to a user of a client device 110 or operator device 115 and conditions associated with disabling the lock 140 may be added or amended over time. Examples of conditions for disabling a lock 140 may include the presence of the client device 110 within a geofence boundary associated with the lock (e.g., as detected by the geofence management module 210) within the scheduled time range, the submission of completed forms and documents by a user of the client device 110 or other authorized user, and timing conditions (e.g., a lock 140 may be disabled within a set time window). The lock assignment module 220 tracks the progress of the conditions associated with each lock 140 and can determine whether a lock 140 is authorized to be disabled when a request for disabling the lock 140 is received by the device communication module 205 based on the stored information about whether the conditions have been met. In some embodiments, the lock assignment module 220 may transmit a communication to an application of the client device 110 to display information to a user identifying incomplete documents that will need to be completed and submitted to disable the lock 140.

The lock assignment datastore 225 stores the data from the lock assignment module 220 about lock 140 assignments and conditions associated with locks 140. Scheduling information associating a specific lock 140 with a user of a client device 110 is stored in the lock assignment datastore 225 when the assignment is established. The lock assignment module 220 also accesses information about the scheduled lock 140 assignments to determine which locks 140 will be available for assignment at the required time. In addition to the lock 140 assignments, the lock assignment datastore 225 may store executed documents, submitted forms, information about the current location of the client device 110 in relation to the geofence boundary of the lock 140, and other data associated with conditions for disabling the lock. The lock assignment datastore 225 may also store documents, questionnaires, and other forms that a user may need to complete to meet conditions for disabling a lock 140. If a request to disable the lock is received at the device communication module 205 and the lock assignment module 220 determines that some conditions have not been met, the device communication module 205 may access the required forms at the lock assignment datastore 225 and send the forms to the client device 110 for the user to complete and submit. In some embodiments, the physical lock interface system 130 may have a separate datastore for storing documentation related to lock 140 access and assignments by users.

The lock identification module 230 helps a user to identify the assigned lock 140. A user approaching a lock 140 may not know where the lock 140 is located or which of a plurality of locks 140 will open in response to a request to disable the assigned lock 140. For example, in a vault with many rows of safety deposit boxes with locks 140, it may be difficult for a user unfamiliar with the space to quickly identify a box and lock 140. As another example in a rental car center, a lockbox and associated lock 140 assigned to a user for picking up a key for the rental may be a different lockbox from the box assigned to the user for dropping off the key when returning the vehicle. As a third example, a user of a bikeshare program may be notified by an application that the user is within a geofence boundary of an available locked bicycle, but may not be sure of the exact location of the bicycle. When the device communication module 205 receives a request from a user of a client device 110 or an operator device 115 to disable a lock 140, the lock identification module 230 may activate a lock identifier at or near to the lock 140. Lock identifiers may include blinking lights, colored lights, alert sounds, screens displaying identifying information, mechanical indications, or other features for specifying the correct lock 140. For example, a lock 140 on a safety deposit box may blink a light, a screen on a lockbox at a rental car center may flash and display the user's name, and a lock 140 on a bike share bicycle may beep to alert the user to the location of the bike. In one embodiment, an application of the client device 110 or operator device 115 may support augmented reality features that help the user to identify an assigned lock 140. For example, the user may hold the user device 110 up to capture and display video of a set of locks 140, and the augmented reality system may overlay an indication of the lock 140 assigned to the user in the displayed video stream. In some cases, the lock identification module 230 may not activate a lock identifier until a user of the client device 110 or operator device 115 transmits a signal requesting for the lock 140 to be identified.

The signal detection module 235 receives and processes signals requesting for the lock 140 to be enabled or disabled. In some embodiments, the signal detection module 235 may be a part of the device communication module 205. The signal detection module 235 monitors communications received at the device communication module 205 and determines when an application on a client device 110 or operator device 115 sends a signal requesting to disable a lock 140. In some cases, an application associated with the physical lock interface system 130 may only allow a user to send a signal to disable the lock 140 after conditions associated with disabling the lock have been met or when the user is prepared to open the lock. For example, a user may have met the requirements for disabling a lock 140 be being within the geofence boundary, but may not currently want to disable the lock, in such cases, the physical lock interface system 130 may wait until a signal to disable the lock 140 is received at the signal detection module 235. The signal detection module 235 communicates with the lock management module 240 to enable or disable the physical lock 140.

The lock management module 240 enables and disables the locks 140 in response to signals received from the signal detection module 235. The geofence management module 210, lock assignment module 220, and signal detection module 235 detect whether a user associated with a client device 110 or operator device 115 is within a designated geofence boundary associated with the lock 140 assigned to the user, has fulfilled any additional conditions for disabling the lock 140, and has requested for the lock 140 to be disabled, for example, by transmitting an electronic signal. In various embodiments, any alternate combinations of information from modules and devices associated with the physical lock interface system 130 may be used by the physical lock interface system 130 to determine that a lock 140 can be disabled. In response, the lock management module transmits a signal to the lock 140 mechanism to disable the lock. The lock management module 240 also interacts with locks 140 to enable lock 140 mechanisms. Similarly to disabling a lock 140, the lock management module 240 may have various conditions for enabling a lock 140. Such conditions may be monitored by the geofence management module 210, lock assignment module 220, and signal detection module 235 and may vary depending on the use case of the lock 140.

The lock interaction detection system 245 interfaces with sensors and detectors that may be associated with a lock 140 to detect and verify lock 140 interactions. In some example embodiments, the lock interaction detection system 245 comprises sensors that can determine if one or more locks 140 has been physically enabled, disabled, or tampered with. Sensors may include motion sensors, video recordings, and magnetic or other mechanical sensors. The lock interaction detection system 245 communicates with the lock management module 240 when a sensor detects an interaction with a lock 140. If the lock interaction is not expected (i.e., the lock management module 240 did not send a corresponding signal to enable or disable the lock 140), the lock interaction detection system 245 may communicate with an operator device 115 to alert operators to the unauthorized lock 140 activity. In some cases, the lock interaction detection system 245 may also notify operator devices 115 of some or all detected lock 140 interactions, including scheduled and authorized lock 140 interactions. In some embodiments, the lock interaction detection system 245 may communicate with other modules of the physical lock interface system 130 to enable a lock 140 if unauthorized or unusual activity is detected in relation to the lock 140. For example, responsive to detecting that a lock has been tampered with, the lock interaction detection system 245 may request that the lock management module 240 enable the lock 140, and may request that the lock assignment module 220 add additional conditions to the lock 140 assignment for disabling the lock. Example additional conditions may include receipt of authorization from an operator device 115 that the lock 140 may be disabled and/or extra authentication via an application of the client device 110 to confirm that the user of the client device 110 is involved in disabling the lock 140. For example, the device communication module 205 may send a two-factor authentication message or a verification code to a verified account associated with the user of the client device 110 requesting access to the lock 140.

In some embodiments, the physical lock interface system 130 includes an original equipment manufacturer (OEM) communication module 250. The OEM communication module 250 provides a way for the physical lock interface system 130 to communicate requests and instructions to equipment associated with the locks 140. For example, a physical lock interface system 130 associated with lockboxes for keys at a car dealership may be able to communicate with the OEM systems of vehicles at the dealership using the OEM communication module 250. The OEM communication module 250 may provide extra layers of security and authorization for the equipment that is secured by the locks 140 of the physical lock interface system 130. Expanding on the car dealership example, the dealership may provide loaner vehicles that a user can drive while their car is being serviced. To allow the user to pick up the loaner vehicle at their convenience, the key to the loaner vehicle may be stored in a lockbox secured by a lock 140 and assigned by the lock assignment module 220 to the client device 110 associated with the user renting the vehicle. If the lock interaction detection system 245 detects unauthorized access or tampering with the lock 140, the OEM communication module 250 can communicate with the OEM systems to request that an onboard computer on the rental vehicle disables access, operation, or ignition of the vehicle itself until an operator has authorized the access or until a two-factor authentication has confirmed that the correct user has possession of the vehicle keys. Communications by the OEM communication module 250 can vary depending on the type of equipment that is associated with the locks 140.

The OEM communication module 250 or another module of the physical lock interface system 130 (e.g., such as the device communication module 205) manages authorization and verification of users of the client devices 110 and users of the operator devices 115. The physical lock interface system 130 may require verification of an authorized user to enable or disable a lock 140 or to disable extra security from an OEM system. To verify a user, the physical lock interface system 130 communicates instructions to an application installed on the client device 110 (or operator device 115) that is associated with the physical lock interface system 130 to prompt the user of the client device 110 to take an extra step that will be needed to access the items secured by the lock 140 or otherwise managed by the physical lock interface system. In some embodiments, rather than a prompt or notification from an application, the user may receive information about additional verification steps via a text message, phone call, email, or other messaging format. In one embodiment, the physical lock interface system 130 uses multi-factor authentication to verify a user. For example, the prompt, notification, or message sent to a verified user account, address, or phone number associated with the client device 110 may include a code or other message. The user inputs the code or other message in a prompt either at the application of the client device 110 associated with the physical lock interface system 130, or at another input location such as at the lock 140. When the user is verified (e.g., upon receipt of a verified code or message), the physical lock interface system 130 may proceed to disable or enable a lock 140, or may communicate via the OEM communication module 250 to provide access to a secured system. For example, when a user is verified, OEM communication module 250 communicates with OEM system to release whatever extra security measure was instituted (such as preventing access or ignition to a vehicle without verification of the user).

Figure 3:
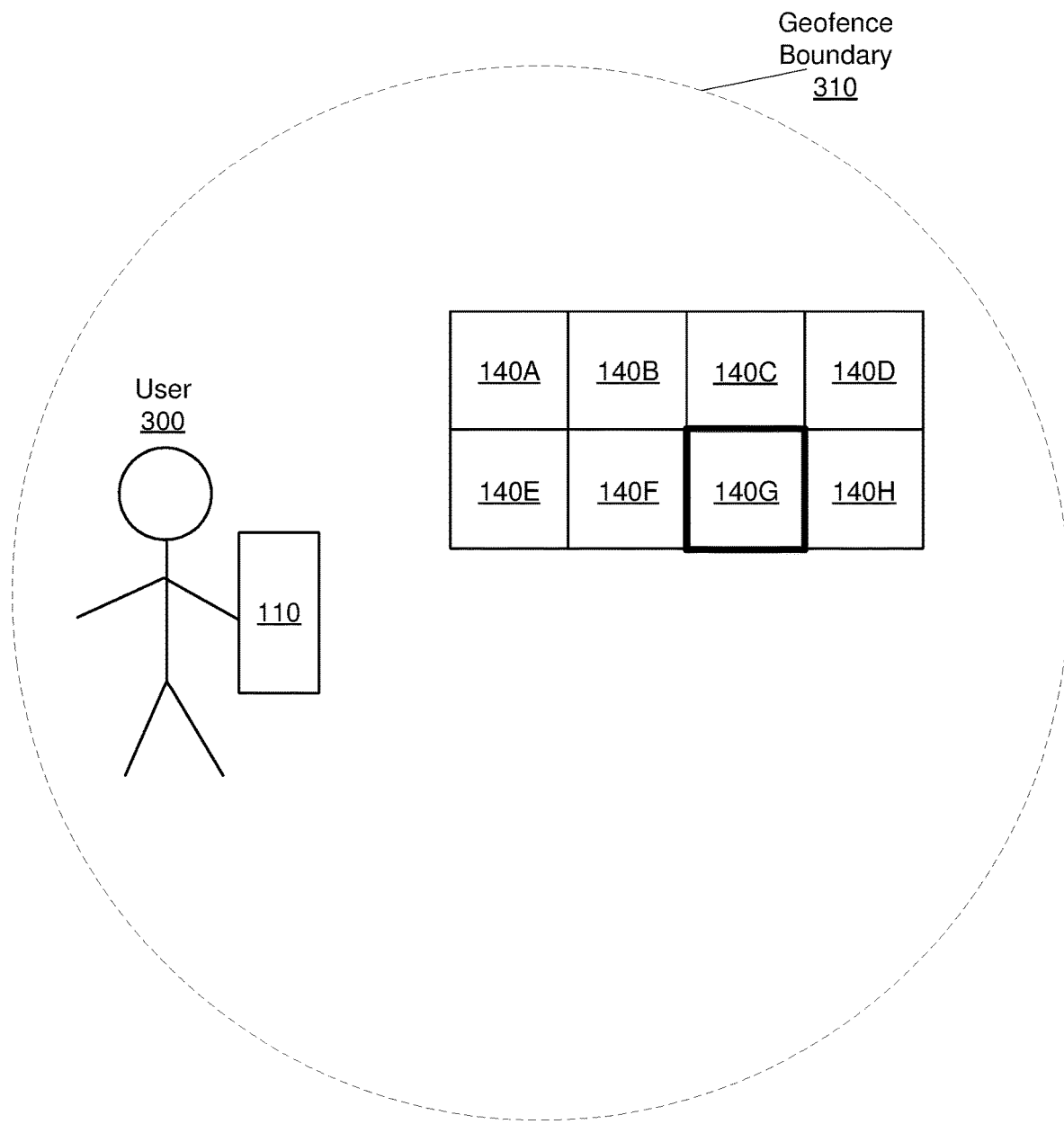
FIG. 3 illustrates a system environment for locks associated with the physical lock interface system, in accordance with an example embodiment.

FIG. 3 illustrates a system environment for locks 140 associated with the physical lock interface system 130, in accordance with an example embodiment. In the example of FIG. 3, a physical lock interface system 130 manages a set of eight lockboxes, each secured by a lock 140 (i.e., locks 140A, 140B, 140C, 140D, 140E, 140F, 140G, and 140H). A user 300 of a client device 110 has entered a geofence boundary 310, depicted by a dashed circle. The user 300, is depicted in FIG. 3 as a stick figure representing a person, but the user 300 could also be a car or other vehicle. The geofence boundary 310 is associated with one or more of the locks 140 by the geofence management module 210. The geofence management module 210 detects that the user 300 is within the geofence boundary (e.g., using facial recognition to identify the user, or by verifying a license place image of a car of the user). The user 300 approaches the lockboxes (e.g., a wall of lockboxes as depicted in FIG. 3 or one or more lockboxes in another configuration) and transmits a request to identify the lockbox and lock 140 associated with the user 300 via an application on the client device 110. In response, the lock identification module 230 causes a light at lock 140G to blink (as depicted by a bold outline in FIG. 3). The user 300, being within the geofence boundary 310 and having located the lockbox and lock 140G, sends, via the application on the client device 110, a request signal to the signal detection module 235 to disable the lock 140G so that the user 300 can open the lockbox. The lock assignment module 220 determines whether the user 300 has completed the conditions associated with disabling the lock 140, and once the conditions are met, the lock management module 240 transmits a signal to the lock 140G to disable the lock.

Figure 4:
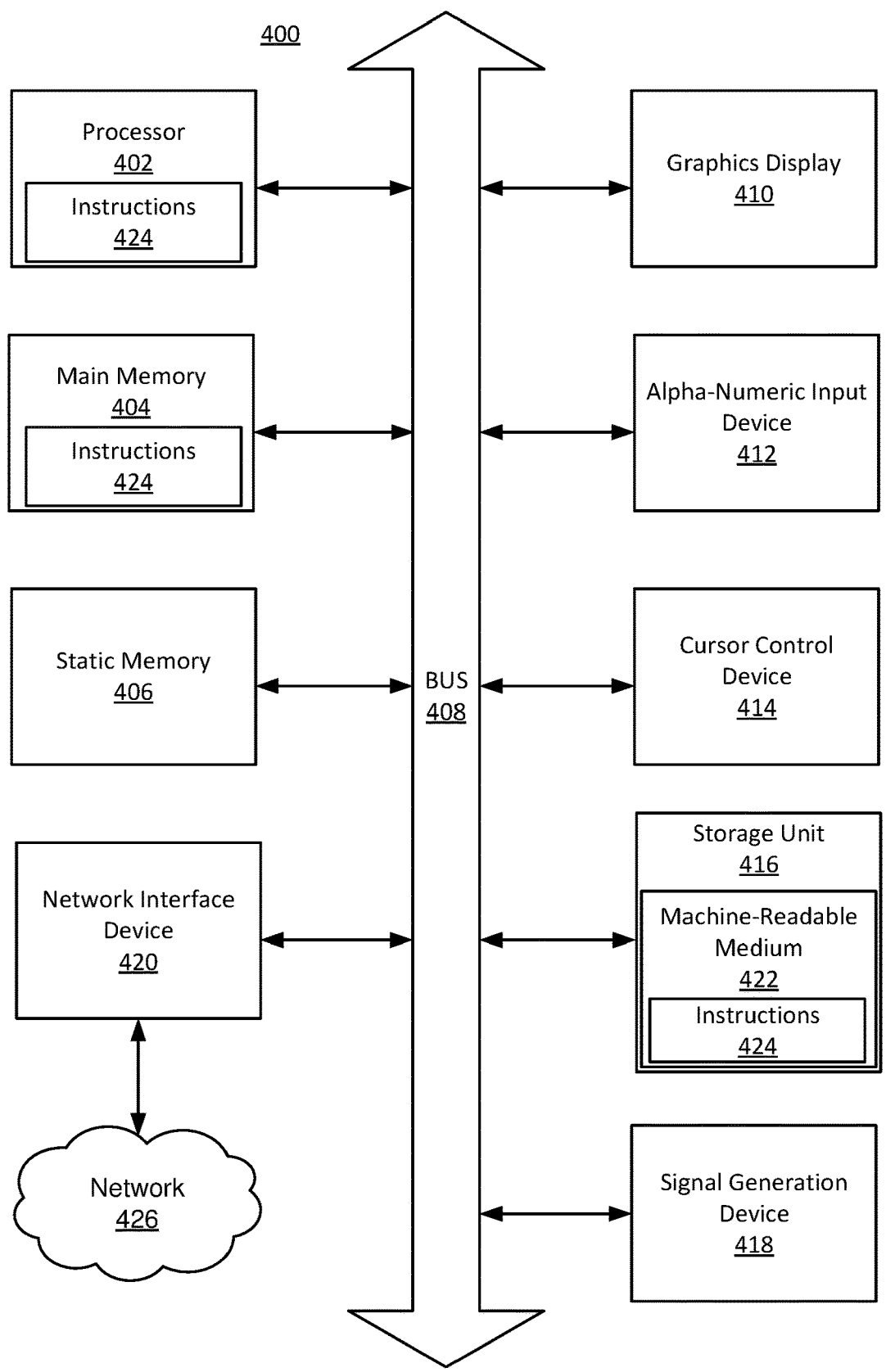
FIG. 4 is a block diagram illustrating components of an example machine able to read instructions from a machine-readable medium and execute them in one or more processors (or controllers).

FIG. 4 is a block diagram illustrating components of an example machine able to read instructions from a machine-readable medium and execute them in one or more processors (or controllers). Specifically, FIG. 4 shows a diagrammatic representation of the physical lock interface system 130 in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 406 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include instructions for implementing the functionalities of the device communication module 205, the geofence management module 210, the lock assignment module 220, the lock identification module 230, the signal detection module 235, the lock management module 240, the lock detection system 245, and the OEM communication module 250. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426, such as the network 120, via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Figure 5:
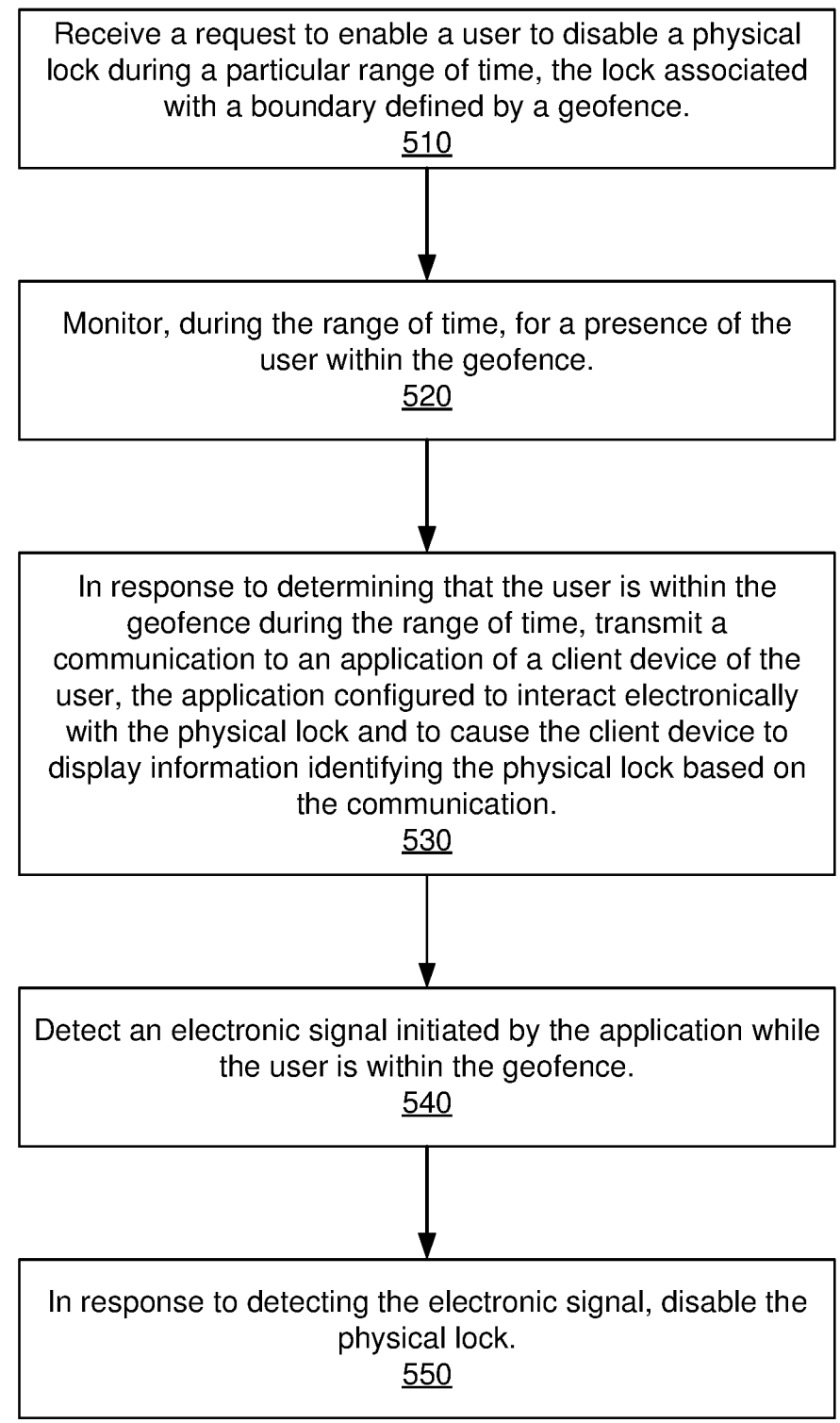
FIG. 5 is a flowchart illustrating a method facilitating disablement of a physical lock, in accordance with an example embodiment.

FIG. 5 is a flowchart illustrating a method facilitating disablement of a physical lock, in accordance with an example embodiment. The steps of the flowchart may be performed in processors 402 of a computer system 400 comprising a physical lock interface system 130. The physical lock interface system 130 receives 510 a request to enable a user to disable a physical lock 140 during a particular range of time. For example, the request may be for scheduling a time range in which the user can access and interact with the lock 140. The lock 140 is associated with a boundary defined by a geofence 310. During the range of time, the geofence management module 210 or another module of the physical lock interface system 130 monitors 520 for a presence of the user within the geofence boundary. In response to determining that the user is within the geofence during the range of time, the physical lock interface system 130 transmits 530 a communication to an application of a client device of the user. The application of the client device 110 of the user is configured to interact electronically with the physical lock 140. In some embodiments, the client device 110 interacts electronically with the physical lock 140 via modules of the physical lock interface system 130 such as the lock management module 240. The application of the client device 110 may also be configured to display information that identifies the physical lock 140 based on the transmitted communication. The physical lock interface system 130 detects 540 an electronic signal initiated by the application on the client device 110 while the user is within the geofence boundary. In response to detecting the electronic signal, the lock management module 240 disables the physical lock 140. In various embodiments, an operator device 115 may interact with the physical lock interface system 130 in the same way as the client device 110.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving a request to enable a user to disable a physical lock during a particular range of time, wherein the physical lock is associated with a boundary defined by a geofence, and wherein the physical lock, when disabled, provides access to the user to a physical key for accessing a vehicle;

prior to detecting an electronic signal initiated by an application of a client device of the user while the user is within the geofence, detecting a disabling of the physical lock;

responsive to detecting the disabling of the physical lock, transmitting a communication to a server to prevent access to a vehicle by way of the physical key without additional verification;

during the particular range of time, monitoring for a presence of the user within the boundary defined by the geofence;

in response to determining that the user is within the boundary defined by the geofence during the particular range of time, transmitting a communication to an application of the client device of the user, the application configured to interact electronically with the physical lock, and the application configured to cause the client device of the user to display information identifying the physical lock based on the communication;

detecting the electronic signal initiated by the application while the user is within the geofence; and responsive to detecting the electronic signal, disabling the physical lock, wherein the physical lock was re-enabled subsequent to detecting the disabling of the physical lock prior to detecting the electronic signal.

2. The method of claim 1, further comprising:

transmitting a communication to the application of the client device of the user to cause the client device of the user to display a request for the user to enter a verification code;

receiving the additional verification comprising the verification code; and responsive to the receipt of the additional verification, transmitting a communication to the server to enable access to the vehicle by way of the physical key.

3. The method of claim 1, wherein monitoring for a presence of the user further comprises:

receiving a photo of an area within the boundary defined by the geofence from a camera that is positioned to capture images of vehicles entering the boundary defined by the geofence;

analyzing the photo to determine a unique identifier of a vehicle shown in the photo; and determining that the unique identifier of the vehicle matches a unique identifier of a vehicle that is known to be associated with the user.

4. The method of claim 1, further comprising, prior to disabling the physical lock:

determining one or more documents of a predefined set of documents has not been completed by the user;

transmitting a communication to the application of the client device of the user to cause the client device of the user to display information identifying the one or more incomplete documents; and determining that the one or more incomplete documents are subsequently completed by the user.

5. The method of claim 1, further comprising:

in response to determining that the user is within the geofence during the particular range of time, transmitting an instruction communication to the application of the client device of the user to render for display to the user, instructions for disabling the physical lock.

6. The method of claim 1, further comprising:

in response to determining that the user is within the geofence during the particular range of time, transmitting a light activation communication to a system that manages the physical lock to activate a light associated with the physical lock, the light identifying the physical lock from among a plurality of physical locks.

7. The method of claim 1, further comprising:

responsive to detecting the disabling of the physical lock prior to detecting the electronic signal initiated by the application while the user is within the boundary defined by the geofence, transmitting a communication to an application of a client device of an operator associated with management of the physical lock, the application of the client device of the operator configured to cause the client device of the operator to display information identifying the physical lock based on the detection, the communication including instructions to display the information identifying the physical lock based on the detection.

8. A non-transitory computer-readable medium comprising memory with instructions encoded thereon, the instructions, when executed by one or more processors, causing the one or more processors to perform operations, the instructions comprising instructions to:

receive a request to enable a user to disable a physical lock during a particular range of time, wherein the physical lock is associated with a boundary defined by a geofence, and wherein the physical lock, when disabled, provides access to the user to a physical key for accessing a vehicle;

prior to detecting an electronic signal initiated by an application of a client device of the user while the user is within the geofence, detect a disabling of the physical lock;

responsive to detecting the disabling of the physical lock, transmit a communication to a server to prevent access to a vehicle by way of the physical key without additional verification;

during the particular range of time, monitor for a presence of the user within the boundary defined by the geofence;

in response to determining that the user is within the boundary defined by the geofence during the particular range of time, transmit a communication to an application of the client device of the user, the application configured to interact electronically with the physical lock, and the application configured to cause the client device of the user to display information identifying the physical lock based on the communication;

detect the electronic signal initiated by the application while the user is within the geofence; and responsive to detecting the electronic signal, disable the physical lock, wherein the physical lock was re-enabled subsequent to detecting the disabling of the physical lock prior to detecting the electronic signal.

9. The non-transitory computer-readable medium of claim 8, the instructions further comprising instructions to:

transmit a communication to the application of the client device of the user to cause the client device of the user to display a request for the user to enter a verification code;

receive the additional verification comprising the verification code; and responsive to the receipt of the additional verification, transmit a communication to the server to enable access to the vehicle by way of the physical key.

10. The non-transitory computer-readable medium of claim 8, wherein the instructions to monitor for a presence of the user further comprise instructions to:

receive a photo of an area within the boundary defined by the geofence from a camera that is positioned to capture images of vehicles entering the boundary defined by the geofence;

analyze the photo to determine a unique identifier of a vehicle shown in the photo; and determine that the unique identifier of the vehicle matches a unique identifier of a vehicle that is known to be associated with the user.

11. The non-transitory computer-readable medium of claim 8, the instructions further comprising, prior to disabling the physical lock, instructions to:

determine one or more documents of a predefined set of documents has not been completed by the user;

transmit a communication to the application of the client device of the user to cause the client device of the user to display information identifying the one or more incomplete documents; and determine that the one or more incomplete documents are subsequently completed by the user.

12. The non-transitory computer-readable medium of claim 8, the instructions further comprising instructions to:

in response to determining that the user is within the geofence during the particular range of time, transmit an instruction communication to the application of the client device of the user to render for display to the user, instructions for disabling the physical lock.

13. The non-transitory computer-readable medium of claim 8, the instructions further comprising instructions to:

in response to determining that the user is within the geofence during the particular range of time, transmit a light activation communication to a system that manages the physical lock to activate a light associated with the physical lock, the light identifying the physical lock from among a plurality of physical locks.

14. The non-transitory computer-readable medium of claim 8, the instructions further comprising instructions to:
responsive to detecting the disabling of the physical lock prior to detecting the electronic signal initiated by the application while the user is within the boundary defined by the geofence, transmit a communication to an application of a client device of an operator associated with management of the physical lock, the application of the client device of the operator configured to cause the client device of the operator to display information identifying the physical lock based on the detection, the communication including instructions to display the information identifying the physical lock based on the detection.

15. A system comprising:
a non-transitory computer-readable medium comprising memory with instructions encoded thereon; and
one or more processors that, when executing the instructions, are caused to perform operations comprising:
receiving a request to enable a user to disable a physical lock during a particular range of time, wherein the physical lock is associated with a boundary defined by a geofence, and wherein the physical lock, when disabled, provides access to the user to a physical key for accessing a vehicle;
prior to detecting an electronic signal initiated by an application of a client device of the user while the user is within the geofence, detecting a disabling of the physical lock;
responsive to detecting the disabling of the physical lock, transmitting a communication to a server to prevent access to a vehicle by way of the physical key without additional verification;
during the particular range of time, monitoring for a presence of the user within the boundary defined by the geofence;
in response to determining that the user is within the boundary defined by the geofence during the particular range of time, transmitting a communication to an application of the client device of the user, the application configured to interact electronically with the physical lock, and the application configured to cause the client device of the user to display information identifying the physical lock based on the communication;
detecting the electronic signal initiated by the application while the user is within the geofence; and
responsive to detecting the electronic signal, disabling the physical lock, wherein the physical lock was re-enabled subsequent to detecting the disabling of the physical lock prior to detecting the electronic signal.

16. The system of claim 15, the processors, when executing the instructions, further caused to perform operations comprising:
transmitting a communication to the application of the client device of the user to cause the client device of the user to display a request for the user to enter a verification code;
receiving the additional verification comprising the verification code; and
responsive to the receipt of the additional verification, transmitting a communication to the server to enable access to the vehicle by way of the physical key.

17. The system of claim 15, wherein instructions for monitoring for a presence of the user, when executed by the one or more processors, further cause the one or more processors to perform operations comprising:
receiving a photo of an area within the boundary defined by the geofence from a camera that is positioned to capture images of vehicles entering the boundary defined by the geofence;
analyzing the photo to determine a unique identifier of a vehicle shown in the photo; and
determining that the unique identifier of the vehicle matches a unique identifier of a vehicle that is known to be associated with the user.

* * * * *